Nov. 23, 1965  O. STÜRNER ETAL  3,218,919
APPARATUS FOR MAKING COLOR COMPOSITIONS
Filed Oct. 9, 1962  4 Sheets-Sheet 1
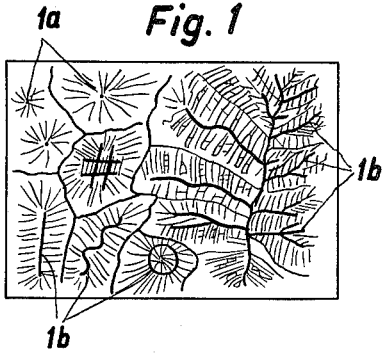
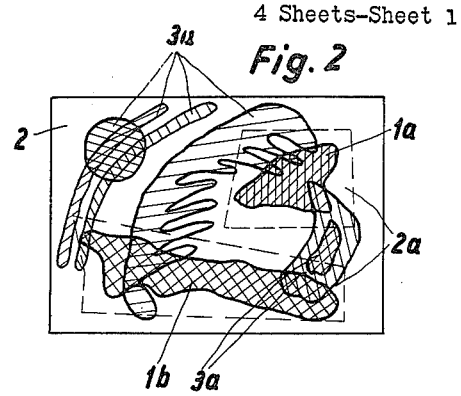
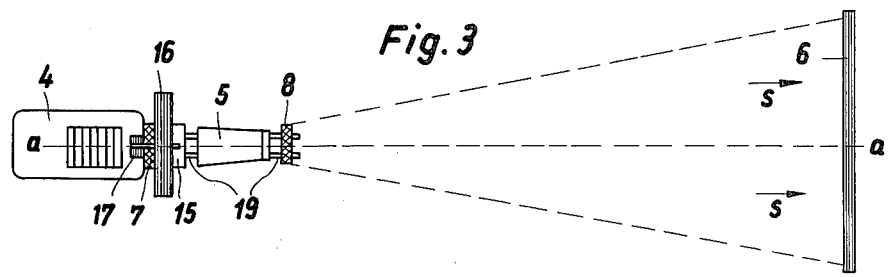
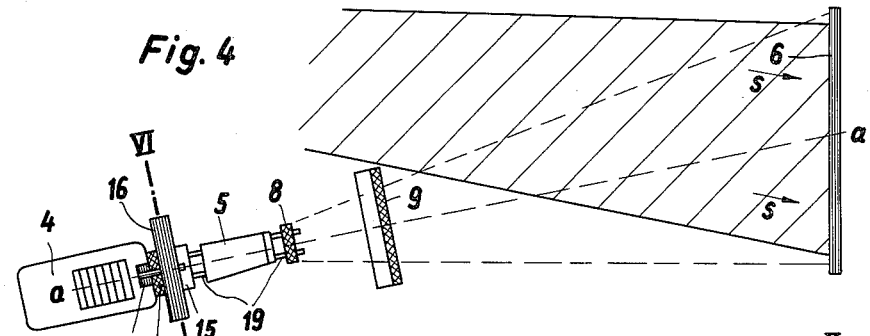
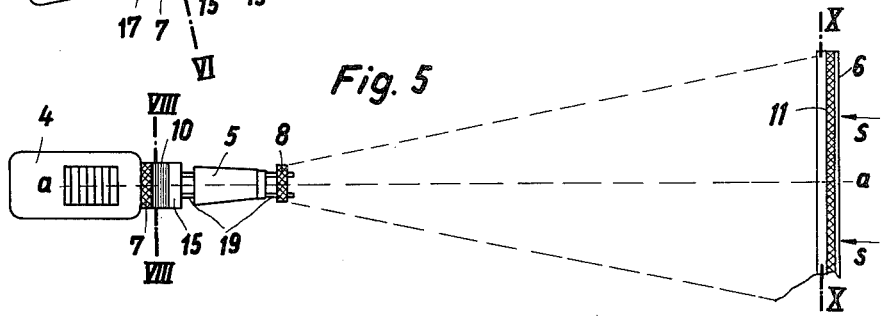
*Inventors*
OTTO STÜRNER
FRITZ MAYER
BY: Spencer & Kaye
ATTORNEYS Nov. 23, 1965    O. STÜRNER ETAL    3,218,919
APPARATUS FOR MAKING COLOR COMPOSITIONS
Filed Oct. 9, 1962    4 Sheets-Sheet 3
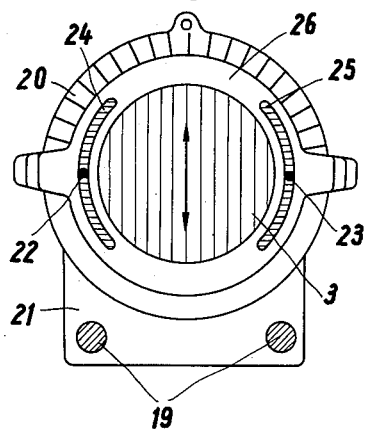
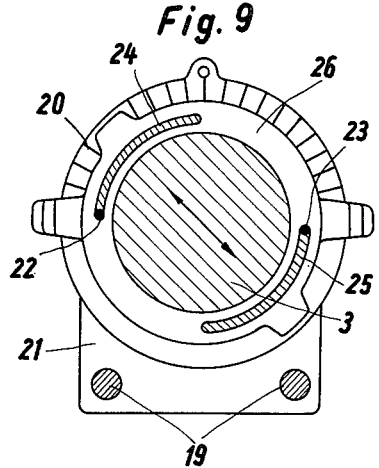
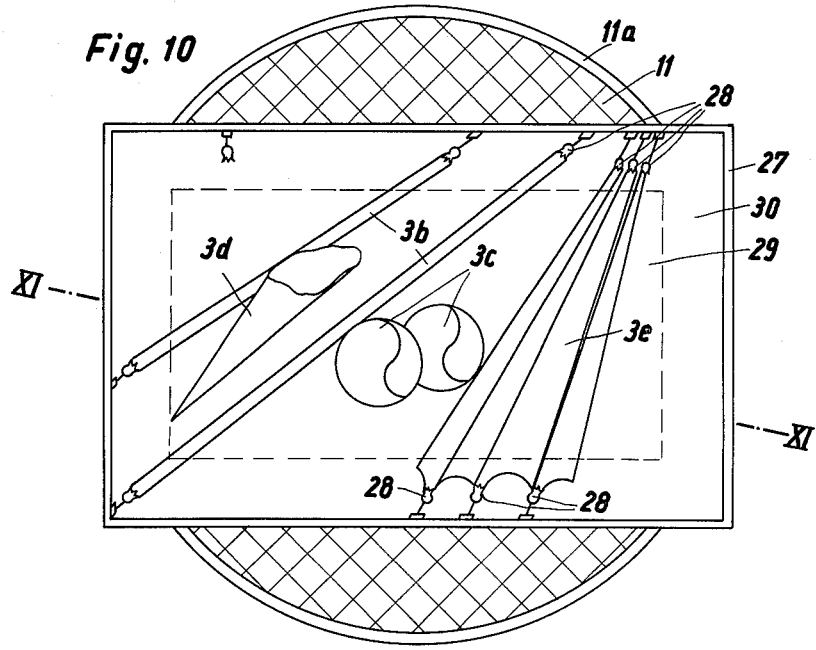
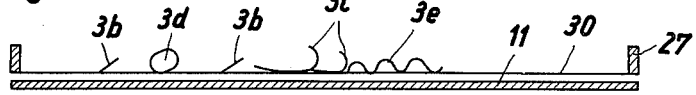
Inventors
OTTO STÜRNER
FRITZ MAYER
BY: Spencer & Kaye
ATTORNEYS Nov. 23, 1965   O. STÜRNER ETAL   3,218,919
APPARATUS FOR MAKING COLOR COMPOSITIONS
Filed Oct. 9, 1962   4 Sheets-Sheet 4
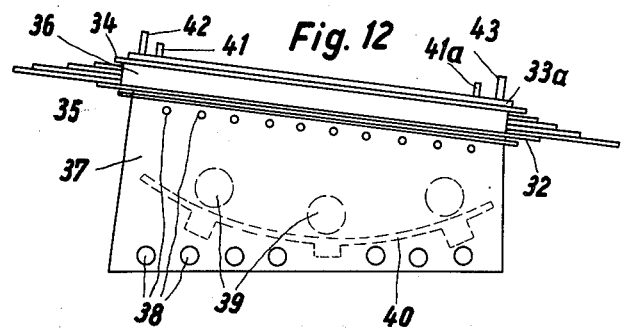
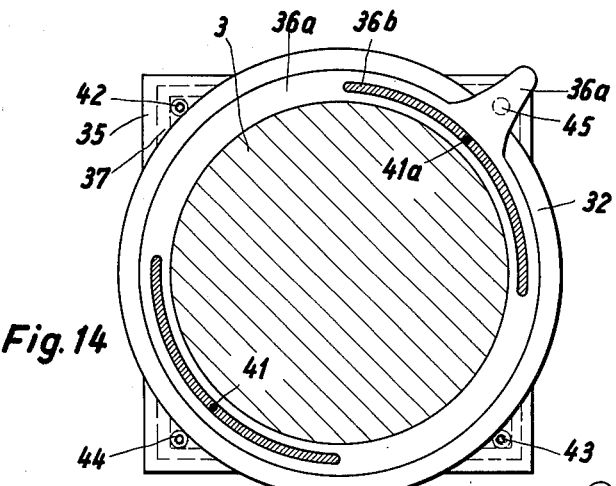
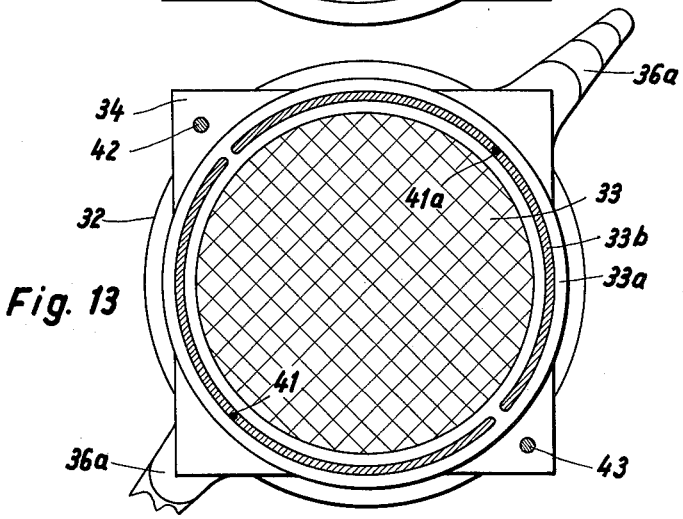
Inventors
OTTO STÜRNER
FRITZ MAYER
BY: Spencer & Kaye
ATTORNEYS 3,218,919
APPARATUS FOR MAKING COLOR COMPOSITIONS
Otto Stürner and Fritz Mayer, Calw-Wimberg, Germany (both of Julius-Naeherstrasse 13, Pforzheim, Germany)
Filed Oct. 9, 1962, Ser. No. 229,399
Claims priority, application Germany, Oct. 14, 1961, St 18,438
17 Claims. (Cl. 88—24)

The present invention relates to an apparatus for making color compositions, hereinafter referred to as displays.

More particularly, the present invention relates to an apparatus for making color displays through chromatic polarization, wherein an optically anisotropic medium is arranged between two at least partially rotatable polarizers in the path of light rays of a projection or illumination system.

An "optically anisotropic medium," as hereinafter used in the instant specification and claims, will be understood to be a medium which has different optical properties in different spatial directions, i.e., a medium which, for example, is doubly refractive or which, in polarized light, will upon rotational dispersion rotate the polarization plane.

It is the primary object of the present invention to provide the means for making and forming an anisotropic medium for use in an apparatus of the type mentioned above, because only a comprehensive assortment of such means and methods makes it possible to select those color and form phenomena inherent in the chromatic polarization of light which can be utilized for producing aesthetic color displays.

It is a further object of the present invention to provide an apparatus of the type described above which can visually reproduce the aesthetically valuable phenomena in such a manner as to produce basic style-type elements which, by simple manipulation of the optically polarized medium, can be continually transformed. The transformations include changes in the color composition, changes in the bright-dark or contrast effect, and, within certain limits, changes in the configuration of the displays.

It is yet another object of the present invention to arrange the apparatus in such a manner that aesthetically uniform pictures can be produced which represent a predetermined conceptual image.

The invention may be used for any one of a number of different purposes. For example, a simplified form of the apparatus, incorporating an illuminating system, can be used as a toy for children, where it can also serve to impart to the child a sense of color or shapes.

More sophisticated versions of the apparatus can be used for training the sense of color.

The invention is further usable as a means for designing textile patterns.

Inasmuch as the color and configuration of the pictures can be changed by simple manipulation of the optical components, the pictures can also be used as introductory displays prior to, or as transition displays between, cinematographic or television performances.

Finally, by using a sufficiently comprehensive assortment of means, it is possible to fashion the anisotropic medium according to certain guide pictures which serve as inspiration to artistic conceptions. High artistic results can be achieved when the guide pictures embody, or are symbolic of, a meaningful and significant concept, such as the contents of a Goethe impressionistic or lyric poem, or of the cosmos scenes of Faust I and II. In this way, there may be obtained what may be termed "music in polarized color" namely, a synthesis of the picture sequences obtained by the present invention and an appropriate musical selection. The starting point of such color music can be a picture to which the rhythm, or counter-rhythm, of a corresponding selection is assigned. Alternatively, the starting point may be a given musical selection, such as "Alpenmusik" by Richard Strauss, for which appropriate pictures will then be created.

For all of the above purposes, it will generally be necessary to make permanent records of the pictures, either by cinematographic or still photography.

Additional objects and advantages of the present invention will become apparent upon consideration of the following description when taken in conjunction with the accompanying drawings in which:

FIGURE 1 shows a crystalline layer forming part of an optically anisotropic medium according to the present invention, the layer having arbitrarily fixed crystallization centers and fronts.

FIGURE 2 is a schematic representation of an anisotropic medium composed of crystalline layers and anisotropic foils.

FIGURE 3 is a plan view of a projection system incorporated in an apparatus according to the present invention.

FIGURE 4 is a modification of the embodiment shown in FIGURE 3.

FIGURE 5 is another modification of the embodiment of FIGURE 3.

FIGURE 8 is a sectional view, on an enlarged scale, taken on line VIII—VIII of FIGURE 5.

FIGURE 9 is a sectional view similar to that of FIGURE 8 but showing the parts occupying a different position.

FIGURE 10 is a sectional view, on an enlarged scale, taken on line X—X of FIGURE 5.

FIGURE 11 is a sectional view taken on line XI—XI of FIGURE 10.

FIGURE 12 is a side view of an illuminating system incorporated in an apparatus according to the present invention.

FIGURE 13 is a plan view of the embodiment of FIGURE 12.

FIGURE 14 is a plan view similar to FIGURE 13 but with some of the upper parts removed.

Figure 6:
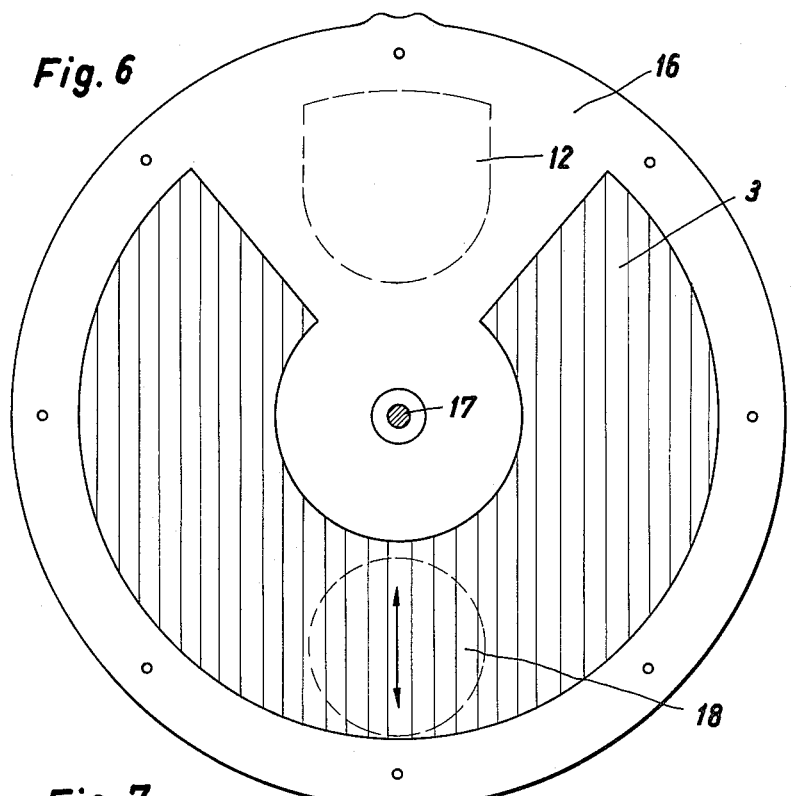
FIGURE 6 is a sectional view, on an enlarged scale, taken on line VI—VI of FIGURE 4.

All of the embodiments of the apparatus according to the present invention comprise a suitably configured anisotropic medium as well as a lighting means, i.e., a projection or illuminating system, by means of which the anisotropic medium is made visible as a colored image display.

The anisotropic medium, which is configured in accordance with the desired aesthetic criteria in mind, is constituted by a crystalline layer 1 and optically anisotropic foils 3, 3a, 3b, 3c, etc.

The above-mentioned crystalline layer is characterized by the fact that it consists of many crystals which normally are non-planar but are inhibited in their free form development. The crystalline layer 1 is applied as a thin coating on a transparent flat carrier 2 having opposite parallel faces, or between two such carriers. The layer is a mixture containing an optically anisotropic compound crystallizable from a melt or from a solution, as well as at least one hydrocarbon. The layer should be such as to absorb no more than a relatively small amount of visible light.

Suitable optically anisotropic compounds are, for example, liquid crystals, as well as aromatic acids and esters thereof, as well as higher members of the fatty acid series.

Crystalline liquids are substances of high optical polarization activity, which, in both solid crystal as well as in crystalline liquid phase, have the typical optical characteristics of crystals. At room temperature, all compounds in this group are in solid state.

By admixing at least one hydrocarbon with the anisotropic compound, the crystalline type of the crystalline layer will be modified, depending on the mixture ratio and the particular admixed hydrocarbon. Accordingly, the mixture added to the crystalline layer will hereinafter be referred to as a modifying compound. The latter has to be a substance which can be dissolved together with the optically anisotropic compound in a common solvent, or solvent mixture, or a substance which can be melted together with the optically anisotropic compound.

Most suitable as modifying compounds will be those compounds which, at the melting point of the mixture, have a relatively high viscosity, e.g., resin acids, resin acid esters, the glycerin esters of unsaturated fatty acids, particularly the glycerin ester of ricinoleic acid (castor oil), and high-polymer organic substances (plastics), such as polystyrene, polyacrylic acid ester, polyvinylchloride, Celluloid, etc. The modifying compounds can, of course, also be substances which themselves are optically anisotropic, e.g., palmitic acid, benzoic acid, stearic acid. The melting points of the substances melted together in the crystalline layer should not differ substantially from each other, nor should these melting points be over 200° C.

The following is a list of compounds which are ingredients from which suitable crystalline layers may be made, each compound being designated by a letter.

A—p-p-azoxyanisole (liquid crystal)
B—cinnamylicacrylic acid (liquid crystal)
C—benzoic acid
D—cinnamic acid=phenylacrylic acid
E—salicylic acid=o-hydroxy benzoic acid
F—stearic acid
G—palmitic acid
H—ammonium nitrate
J—colophony
K—levo-pimaric acid (constituent of J)
L—castor oil
M—cellulose acetate
N—cellulose acetobutyrate
O—chlorinated diphenyl
P—polystyrene (polymerization product of styrene)
Q—Celluloid
R—Plexiglas=methacrylic acid methyl ester
S—polyvinyl pyrrolidone Compounds A through H, inclusive, are optically anisotropic.

The following are illustrative examples of mixtures according to the present invention, the proportions being ranges of percentages by weight; Examples 1 through 11 being illustrative of a layer crystallized out of a melt and Examples 12 through 17 being illustrative of a layer crystallized out of a solution.

| Example No. | Constituents and percentage by weight | Solvent |
| --- | --- | --- |
| 1 | A, 50–90; J, 50–10 | |
| 2 | A, 50–90; J, 20–10; L, 40–20 | |
| 3 | A, 40–90; L, 60–10 | |
| 4 | A, 50–95; M, 2–8; N, 4–18; O, 3–15 | |
| 5 | B, 50–90; J, 2–10; L, 10–40 | |
| 6 | C, 40–95; L, 60–5 | |
| 7 | E, 40–95; L, 60–5 | |
| 8 | D, 60–95; J, 40–5 | |
| 9 | F, 70–95; B, 30–5 | |
| 10 | A, 10–70; G, 90–30 | |
| 11 | A, 40–95; R, 60–5 | |
| 12 | A, 40–95; R, 60–5 | Chloroform. |
| 13 | A, 40–95; P, 60–5 | Methyl chloride. |
| 14 | H, 80–95; S, 20–5 | Water. |
| 15 | C, 40–95; L, 60–5 | Chloroform. |
| 16 | E, 40–95; L, 60–5 | Ethyl acetate. |
| 17 | D, 40–95; P, 60–5 | Chloroform. |

The limits of the above ranges can in many cases be exceeded in either direction.

The crystalline layer is made by applying the mixture onto the carrier and letting the mixture cool, or letting the solvent evaporate, as the case may be.

Further examples are:

| Example No. | Constituents and percentage by weight | Solvent |
| --- | --- | --- |
| 18 | A, 90; J, 10 | |
| 19 | A, 70; J, 10; L, 20 | |
| 20 | A, 75; L, 25 | |
| 21 | A, 80; F, 20 | |
| 22 | C, 70; L, 30 | |
| 23 | A, 80; R, 20 | Chloroform. |
| 24 | A, 80; P, 20 | Methyl chloride. |

It has been found that if a mixture is dissolved in a solvent and is at the same time heated, a crystalline layer obtained by letting the mixture cool and at the same time letting the solvent evaporate will be of particularly fine crystalline structure if the evaporation is not permitted to proceed to completion. This may be done by covering the layer, before the complete evaporation of the solvent, with a cover plate, made, for example, of glass, thereby retaining a residuum of solvent in the mixture.

With different mixing ratios, interesting mixture phenomena will be found to occur in different regions of the crystalline layer.

Except for the selection of the particular constituents of the mixture forming the crystalline layer, the most important factors affecting the crystallization involve the control of the temperature and of the evaporation step. Thus, the centers and fronts from which the crystallization proceeds can be predetermined by letting the cooling or evaporation, as the case may be, progress in different regions of the layer at different speeds or in different directions. The positions of the centers of crystallization, and the fronts, can accordingly be selected to be such as to obtain the desired conceptual contents of the display.

FIGURE 1 shows the desired crystallization centers and fronts obtained in a crystalline layer derived from a melt, the layer consisting of 90 parts by weight of p-p-azoxyanisole and 10 parts by weight of colophony. The positions of the centers 1a and 1b were fixed by means of a rapid cooling; this was brought about by placing a good heat conductive body into contact, for a short period of time, with the mixture which was applied to the carrier 2.

Alternatively, the centers and fronts of the crystallization can, in the case of a crystalline layer derived from a melt, be fixed in the following manner: the mixture applied to the carrier is covered with a foil which is provided with cut-outs whose positions correspond to those of the centers and fronts. Cool air is then blown onto the foil, thereby cooling the uncovered areas of the mixture more rapidly than the covered areas.

The crystalline layer will have substantially different crystalline structure, depending on whether the mixture was applied between two carriers having opposite parallel faces, e.g., two glass plates, or whether the mixture was applied simply to one face of one such carrier. In the latter case, the layer will, after solidification, normally have a three-dimensional upper surface. On the other hand, if the layer is placed between two glass plates and pressed therebetween before the crystallization is completed, it is possible to pre-select the thickness of the final layer.

The essential characteristic feature of the crystalline layer according to the present invention is that it consists of many crystals, the latter being normally not planar, but being the result of a predetermined and predeterminable crystallization process. While the crystalline layer will have different degrees of elasticity in different directions, as does a crystal, the layer will not have the usual crystalline form as determined by the molecular structure of the substance. Thus, what is important in making the layer is that the crystallization process be either carefully controlled or that it purposely be permitted to undergo, within limits, a certain uncontrolled progression. Accordingly, the crystallization process is thus subjected to an inhibiting effect, i.e., in order to obtain a virtually unlimited number of different final crystallization layers, the crystallization process is, in some manner, kept in check. In this way, there may be obtained an enormous variety of different structures and patterns which themselves can then be used to form the displays. Naturally, the various displays may, if the crystalline layers were made by basically similar though not identical processes, be made to have aesthetically uniform appearances.

Certain mixtures, as, for instance, the ones set forth in Examples 1, 2, 3, 4, 12, and 13, have such characteristics as to produce, as crystalline layers, interference colors even if but a single polarizer and optically anisotropic foils 3 are positioned in the path of the light rays of the projection or illumination system. The fact that it is possible to operate with but one polarizer is of significance particularly when the picture is to be greatly magnified because the light absorption is correspondingly lower than if two or three polarizers are used.

There will now be described the optically anisotropic foils as a part of the optically anisotropic medium.

In contradistinction to film-like thin crystalline layers made of pure anisotropic compounds, which will produce interference colors of high brilliance even without the presence of anisotropic foils, crystalline layers made of mixtures incorporating one or more modifying compounds will often produce no interference colors, or only weak or dull colors. In order that the structural phenomena of such weak-colored crystalline layers can be seen in different colors, it is desirable to provide the same with at least one optically anisotropic layer of uniform fine structure, e.g., an optically anisotropic foil, whose phase difference will, in the path of the light rays of the projection or illuminating system, either be added to or subtracted from the phase difference of the crystalline layer.

Optically, anisotropic foils are foils made of high-polymer organic compounds, such as plastics, which—as explained above—have different optical properties in different spatial directions, e.g., which are doubly refractive or which, in polarized light, will upon rotational dispersion rotate the polarization plane. Such foils will have a regular fine structure which, in different spatial directions, will have different geometric dimensions; they have a definite main direction of molecular orientation. Foils which are particularly suited for this are optically anisotropic cellulose hydrate foils, as well as optically anisotropic polyethylene foils and polyterephthalic acid ester foils. If a plurality of foils $3a$, $3b$, etc., are placed between the polarizers in the path of the light rays, which foils partially overlap each other and have different geometric base shapes and their main molecular orientation extending in different directions, there being no crystalline layer, different colors will be formed due to the three-dimensional optically anisotropic layer obtained from the sum of all foils. The fact that there will be different colors is the result of the different thicknesses of the optically anisotropic over-all layer derived from the overlapping of the foils, and also the result of the different main directions of molecular orientation. The reason for this is that the luminosity of the color of such an anisotropic foil is at a maximum when the main direction of molecular orientation is at an angle of 45° to the direction of vibration of the polarizer. The luminosity of the color will be at a minimum when the main direction of molecular orientation coincides with the direction of vibration of the polarizer. The foils can easily be cut and trimmed with a pair of scissors and be superposed so as to obtain a three-dimensional anisotropic composite layer having a predetermined three-dimensional structure. Such foils can be made so as to correspond with the shape of the crystalline layer. The image portion produced by the crystalline layer is thus combined with the image portion produced by the multiple foil layer so as to obtain a total image of predetermined aesthetic content.

Particular regions of crystallization of the crystalline layer can be emphasized by color by letting them be brought out by one or more stationary foils of corresponding geometric shape. Moreover, contrasts between markedly diverging aesthetic structures, which arise within the crystalline layer, can be deemphaisized by means of stationary foils.

FIGURE 2 shows crystalline layers $1a$ and $1b$ of different materials, these layers being applied to separate carriers $2a$ which, in turn, are mounted on a common carrier 2. The layers $1a$ and $1b$, which are incorporated as style or pattern elements in the over-all image, cooperate with anisotropic foils $3a$ of different geometric shapes and different main direction of molecular orientation, to produce a harmonic display having the desired aesthetic effect.

The anisotropic foils $3a$ are arranged in a plane which is parallel to the crystalline layers $2a$ and $2b$ and which is therefore transverse to the optical axis of the projection system. Consequently, sharp color contours are obtained in the display.

If the different colors are to be less sharply separated from each other, i.e., if the colors are to run into each other at their juncture, this can be done by letting the anisotropic foils extend at least partly out of the above-mentioned transverse plane.

FIGURES 10 and 11 show such foils. The strip-shaped foils $3b$ extend, in cross section, at an angle to the optical axis. The approximately circular foils $3c$ arch out of the transverse plane, and the foils $3d$ and $3e$ are deformed into more or less closed three-dimensional forms. Also shown are a frame 26 on which the retaining clamps 28 are mounted for longitudinal movement along the edge of the frame. The foils $3c$ and $3d$ are carried by a carrier foil 30, the same having a cut-out 29 through which the composition can be seen. Also shown is a polarizer 11 and its frame $11a$.

The polarized light rays of the parallel (orthoscopic) light beams of the projector or illuminating system do not pass through the foils $3b$, $3c$, $3d$, $3e$, substantially at right angles, but at an angle to the optical axis, the angle depending on the position of the foil, thereby producing a corresponding color difference.

If rotatable foils 3 (see FIGURES 3 to 5 in conjunction with FIGURES 6 to 9) are arranged in the path of light rays of the lighting system in a plane transverse to the optical axis and so as to cover the entire illuminated surface area, without there being the crystalline layer 1 and stationary foils $3b$, $3c$, $3d$, $3e$, the projection surface 6 will appear in a given uniform color. This color can, by rotating the anisotropic foils 3, be changed over into another color, as is explained by the above-mentioned physical laws relating to the main direction of molecular orientation.

It is due to the fact that the phase difference of the foils 3 is added to or subsracted from that of the crystalline layer 1 and also the fact that the stationary foils 3a and 3b pertaining to layer 1 have different geometric forms and different directions of molecular orientation, that it is possible to transform a color display produced by means of the crystalline layer 1 and the foils 3 into many other different color displays. This is done by rotating one or more of the foils 3. As the color composition changes, so does the mutual brightness ratio (luminosity=color ratio) of the different image regions of the color display; to a certain extent, the shape or configuration is changed as well.

The layers of regular fine structure can be constituted not only by the above-mentioned optically anisotropic foils 3, but also by crystal layers of regular crystal structure, e.g., a quartz wedge compensator. The quartz wedge compensator which is customarily used in polarimeters consists of a plate of dextrogyrate or right-handed quartz having opposite parallel faces, and two oppositely arranged, similarly wedge-shaped and mutually displaceable plates of levogyrate or left-handed quartz. These layers of regular crystal structure, e.g., the quartz wedge compensator, thus represent an equivalent of the rotatable anisotropic foils 3 through which the light rays pass in that such quartz wedge allows the display picture to be transformed from one color composition into another. The wedge will not, however, be able to replace the function of the stationary foils because the crystal layers cannot be readily cut to proper size and shape, as is the case with the foils.

Thus, the color display obtained by the sum of all stationary foils 3b, 3c, etc., and the crystalline layer or layers 1, can be transformed into other displays simply by rotating the anisotropic foils 3. This can, of course, be done at any desired speed. Conversely, different colors can be obtained by rotating the polarizers, the latter being constituted by polarization foils. It will be appreciated that the number of color displays that can be obtained can be substantially increased by additionally providing a third polarizer.

Referring now to FIGURES 3 to 5, each of the same shows a projection system having a projector housing 4, containing a light source and condenser lens (not shown). The system further includes an objective 5 held by carrier rods 19. The projection surface is shown at 6. Each system also includes two rotatably mounted polarizers 7 and 8. The direction in which a viewer is to look at the display is indicated by arrows S, the optical axis of the system being indicated by a—a. The projection system according to FIGURE 4 is additionally provided with a third rotatably mounted polarizer 9, the system according to FIGURE 5 likewise having a third polarizer 11 which, however, is non-rotatably mounted. Also shown in each of FIGURES 3 to 5 is a mounting 15 adapted to receive the carrier 2 carrying the crystalline layer 1, the mounting being so arranged that the crystalline layer 1 is in the focal plane of the objective 5. All three projector systems use a parallel (orthoscopic) light bundle and have three rotatably mounted foils 3 each of which can cover the entire area (18 in FIGURES 6 and 7) through which the light bundle passes.

Figure 7:
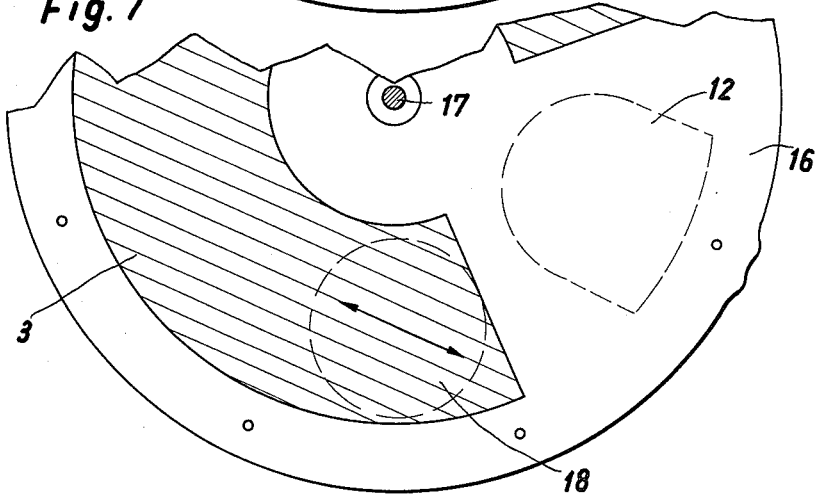
FIGURE 7 is a fragmentary view, similar to that of FIGURE 6, but showing the parts occupying a different position.

In the embodiments of FIGURES 3 and 4, the rotatably mounted anisotropic foils are clamped onto circular frames 16, as shown in FIGURES 6 and 7. These frames are arranged on an axle 17 (FIGURES 3 and 4) mounted on the projector housing 4. As is apparent from FIGURES 6 and 7, the clamped-on foils 3 have the geometric shape of a strip arranged concentrically about the axle 17. The ends of this strip are spaced from each other, the distance corresponding to at least the diameter of the area 18 through which the light bundle passes. This area 18 is eccentric with respect to the axle 17. The frame 16 is made of transparent material. The frame 16 is provided with a cut-out 12 arranged between the two ends of the strip-like foil 3, which cut-out 12 has an area corresponding approximately to that of area 18. When the frame 16 is rotated, the concentrically arranged strip 3 is passed through the light bundle of the projection system, it being evident that, as this rotation progresses, the main direction of molecular orientation constantly changes with respect to the area 18. This is illustrated by the cross hatching of the foil 3, the latter being indicative of the polarization, i.e., the main direction of molecular orientation, of the foil 3.

In the projection system of FIGURE 5, the anisotropic foils 3 are rotatably mounted in another manner, as shown in FIGURES 8 and 9. An annular frame 20, which receives the polarizer 7, is rotatably mounted in a bearing 21. The frame 20 carries two axially extending pins 22, 23, these pins being arranged diametrically opposite each other. The pins 22, 23, in turn, carry the frame 26 to which the foils 3 are clamped. The pins 22, 23, pass through arcuate slots 24, 25, with which the frame 26 is provided. The length of these arcuate slots corresponds to a sector of at least 45°. The frame 26 and the pins 22, 23, are frictionally coupled to each other, the friction being so selected that when the polarizer 7 is rotated, the frame 26, and with it the foils 3, are turned together with the polarizer 7. On the other hand, the frictional coupling can be overcome so that the frame can be turned independently of the polarizer 7.

The parts are shown in FIGURE 9 so that the molecular orientation of the front-most foil 3 is displaced by approximately 45° from the main direction of the foil in FIGURE 8.

FIGURES 12 to 14 show a lighting arrangement in the form of an illuminating system. The same comprises a housing 37 having interiorly arranged light sources 39. The light which is reflected upwardly by a mirror 40, is dispersed by a ground glass disc 35. Arranged on the latter is an embedded polarization foil 32 which serves as the polarizer and which is rotatably mounted by means of four pins 42, 43, 44, 45 (see FIGURE 14) located at the corners of the housing 37. The frame of polarizer 32 carries two diametrically arranged axially extending pins 41, 41a, which guide the frames 36a of anisotropic foils 3 which are rotatably mounted over the polarizer 32. The pins 41, 41a, pass through arcuate slots 36b punched into the frame 36a of the foils 3, so that the foils 3 can carry out a 45° rotation, in either direction, with respect to the polarizer 32. In order to facilitate rotation of the foils 3 independently of each other, the frames 36a are provided with tongue-like extensions serving as handles. The system also includes a stationary carrier plate 34, arranged above the uppermost rotatable foil 3, for carrying stationary anisotropic foils of different geometrical shape and having different main directions of molecular orientation. This plate 34 is held in place by means of the two pins 42, 43, located at two diametrically opposite corners. The pins 44, 45, shown in FIGURE 14, do not extend to the level of the upper plate 34. This plate 34 carrying the foils 3 and one or more adjacent crystalline layers (not shown in this embodiment) also carries a second polarizer 33 in the form of an embedded polarization foil. The plate 34 as well as the edge 33a of the second polarizer each has two arcuate slots 33b whose ends are separated by narrow webs. The pins 41, 41a, pass through the slots 33b. Thus, the second polarizer 33 is mounted in such a manner as to afford a substantial degree of rotatability. Finally, FIGURE 12 shows apertures 38 in the housing 37, which allows the interior of the housing to be ventilated.

The main feature of an illuminating system according to FIGURES 12 through 14 is the arrangement and configuration of the anisotropic medium, on stationary foils having different geometric base shapes and different main directions of molecular orientation, because the aesthetic effect of displays produced by crystalline layers becomes primarily apparent when the picture is magnified to a greater extent. It is, therefore, expedient to equip an illuminating system, as distinguished from the above-described projection system, with a magnifying glass of suitable magnifying power.

It will be understood that the above description of the present invention is susceptible to various modifications, changes, and adaptations, and the same are intended to be comprehended within the meaning and range of equivalents of the appended claims.

What is claimed is:

1. An apparatus for producing color displays by chromatic polarization, comprising, in combination:
    (a) lighting means incorporating
        (1) a light source, and
        (2) at least two polarizers arranged in the path of light rays emanating from said light source, at least one of said polarizers being at least partly rotatable; and
    (b) optically anisotropic means arranged in said path between said polarizers, said anisotropic means incorporating
        (1) at least one optically anisotropic layer of fine structure constituted by at least one optically anisotropic foil, and
        (2) an optically anisotropic crystalline layer arranged on a transparent carrier, said crystalline layer being a mixture composed of
            (i) an optically anisotropic compound and
            (ii) at least one hydrocarbon compound,
    said mixture, in different regions, being made up of different proportions of said optically anisotropic compound and said hydrocarbon compound.

2. An apparatus as defined in claim 1 wherein said foil is rotatably mounted in a plane transverse to the optical axis of said lighting means.

3. An apparatus as defined in claim 1 wherein there are a plurality of optically anisotropic layers of fine structure each of which is an optically anisotropic foil, said foils being stationary and having different geometric patterns and different main directions of molecular orientation.

4. An apparatus as defined in claim 3 wherein said foils extend in three dimensions.

5. An apparatus as defined in claim 3 wherein the geometric basic shape of said foils and their arrangement correspond to regions of different crystalline structure of said crystalline layer.

6. An apparatus as defined in claim 1 wherein said anisotropic compound is a solidified crystalline liquid.

7. An apparatus as defined in claim 1 wherein said optically anisotropic compound is a substance selected from the group consisting of aromatic acids and the higher members of the series of fatty acids.

8. An apparatus as defined in claim 1 wherein said hydrocarbon compound is viscous at the melting point of said mixture.

9. An apparatus as defined in claim 1 wherein said hydrocarbon compound is a high-polymer hydrocarbon.

10. An apparatus as defined in claim 1 wherein said carrier is constituted by a plurality of individual foils carrying differently constituted crystalline layers and a common foil on which said individual foils are mounted.

11. An apparatus as defined in claim 1 wherein said lighting means are a projector system and further include an objective arranged in said path of light emanating from said light source.

12. An apparatus as defined in claims 11 wherein said projector system further incorporates a transparent projection surface.

13. An apparatus as defined in claim 11 wherein said projector system comprises three polarizers arranged in said path of light emanating from said light source.

14. An apparatus as defined in claim 11 wherein the polarizer which is closest to a projection surface onto which the display is projected, is spaced from said objective such a distance that the area of said last-mentioned polarizer through which pass the light rays of the projection system is of a size which is optimal to permit the shaping and mounting of stationary foils.

15. An apparatus as defined in claim 14 wherein at least some of said stationary foils are arranged on said polarizer which is closest to the projection surface.

16. An apparatus as defined in claim 1 wherein said lighting means are an illuminating system.

17. An apparatus for producing color displays by chromatic polarization, comprising, in combination:
    (a) lighting means incorporating
        (1) a light source, and
        (2) at least two polarizers arranged in the path of light rays emanating from said light source, at least one of said polarizers being at least partly rotatable; and
    (b) optically anisotropic means arranged in said path between said polarizers, said anisotropic means incorporating
        (1) at least one optically anisotropic layer of fine structure, and
        (2) an optically anisotropic crystalline layer arranged on a transparent carrier, said crystalline layer being a mixture composed of
            (i) an optically anisotropic compound selected from the group consisting of aromatic acids and the higher members of the series of fatty acids, and
            (ii) at least one hydrocarbon compound.

References Cited by the Examiner

UNITED STATES PATENTS

| | | | |
|---|---|---|---|
| 1,885,642 | 11/1932 | Strong | 272—10 |
| 2,018,214 | 10/1935 | Land | 88—65 |
| 2,070,787 | 2/1937 | Frocht | 88—24 |
| 2,270,323 | 1/1942 | Land et al. | 88—65 |
| 2,393,968 | 2/1946 | Burchell et al. | 88—65 |
| 2,447,805 | 8/1948 | Hyman | 88—65 |
| 2,977,845 | 4/1961 | Boone | 88—24 |
| 3,104,273 | 9/1963 | Ballance | 88—65 |

EVON C. BLUNK, *Primary Examiner.*

WILLIAM MISIEK, *Examiner.*